United States Patent [19]

Matsunawa

[11] Patent Number: 4,710,822
[45] Date of Patent: Dec. 1, 1987

[54] IMAGE PROCESSING METHOD
[75] Inventor: Masahiko Matsunawa, Hino, Japan
[73] Assignee: Konishiroku Photo Industry Co., Ltd., Tokyo, Japan
[21] Appl. No.: 899,751
[22] Filed: Aug. 21, 1986

Related U.S. Application Data

[63] Continuation of Ser. No. 533,430, Sep. 16, 1983, abandoned.

[30] Foreign Application Priority Data

Sep. 21, 1982 [JP] Japan .................................. 57-164419

[51] Int. Cl.$^4$ .............................................. H04N 1/40
[52] U.S. Cl. .................................... 358/280; 358/282; 358/283; 382/51; 382/53
[58] Field of Search ............... 358/282, 283, 284, 298, 358/135, 138, 280; 382/51, 50, 52, 54, 56, 18; 364/515

[56] References Cited

U.S. PATENT DOCUMENTS 4,205,341  5/1980  Mitsuya et al. ...................... 358/282

*Primary Examiner*—Edward L. Coles, Sr.
*Attorney, Agent, or Firm*—Jordan B. Bierman

[57] ABSTRACT

An image processing method is disclosed wherein an image is divided into a plurality of blocks. Each block comprises a plurality of picture elements which are sorted into a first group consisting of picture elements of densities not lower than a reference density and a second group consisting of picture elements of densities lower than the reference density. A representative density of picture elements of the first group and the second group in each block is obtained. An image discrimination is effected in accordance with the representative densities and then a determination of a threshold value is effected in accordance with the representative densities and the result of the image discrimination. The image discrimination and determination of threshold values are conducted by using histograms made out from the representative density of picture elements of the first group in each block and the representative density of picture elements of the second group in each block. Image information is then converted into binary signals according to the threshold value.

5 Claims, 10 Drawing Figures

(a)

| 0 | 16 | 4 | 20 |
|---|----|---|----|
| 24 | 8 | 28 | 12 |
| 6 | 22 | 2 | 18 |
| 30 | 14 | 26 | 10 |

(b)

| 0 | 8 | 2 | 10 |
|---|---|---|----|
| 12 | 4 | 14 | 6 |
| 3 | 11 | 1 | 9 |
| 15 | 7 | 13 | 5 |

(c)

| 5 | 13 | 7 | 15 |
|---|----|---|----|
| 17 | 9 | 19 | 11 |
| 8 | 16 | 6 | 14 |
| 20 | 12 | 18 | 10 |

IMAGE PROCESSING METHOD

This application is a continuation of application Ser. No. 533,430, filed Sept. 16, 1983, now abandoned.

BACKGROUND OF THE INVENTION

1. Field of the Invention

The present invention relates to an image processing method in which, upon discrimination of the image, the image signals are converted into binary signals by a means corresponding to the kind of the image.

2. Description of the Prior Art

In recent years, a remarkable increase in the capacity has been attained in the mediums such as RAMs, hard discs, optical discs and magnetic discs, due to the development of memories of large storage capacities, thanks to a progress in the electronic technologies. In addition, there is a rapid movement for putting optical discs into practical use, as well as development and studies on the magnetic discs and, nowadays, it is possible to write image information in such recording mediums. For instance, an optical disc can store about 10,000 (ten thousand) sheets of A-4 size documents. It is, therefore, a current tendency to use the memories of large capacities, for the storage of the image information. Attempts have been also made to code and compress the image information to be written, in order to further increase the amount of storage of the image information in the memory.

On the other hand, there is an increasing demand for making a hard copy of the image information read out of the memory. Various recording systems are available for this purpose. In the case of heat-sensitive recording system, the recording speed is too low, although it permits an output on the order of 16 grades of gradation. On the other hand, electrostatic recording system (multi stylus system) suffers from a problem that the gradation reproduction is affected too much by the environmental condition, although the recording speed can be increased. Under these circumstances, an image recording system making use of binary dots (white and black) is attracting attention because it can obviate the above-mentioned problems. In this system, in order to materially reproduce half tone with the apparatus which can record only two values of white and black, it is necessary to convert the image information into binary signals. Some methods have been known as the method for binary coding the picture information, such as the binary coding merely by employing a single threshold value and a method so-called dither method. It is a key for attaining a high quality of the reproduced image to adequately set the threshold value or the dither matrix (threshold value group), in conducting the binary coding.

OBJECTS AND SUMMARY OF THE INVENTION

An object of the invention is to provide an image processing method capable of automatically setting a threshold value or the threshold value group suitable for the binary coding of the image information. In other words, it is a primary object of the invention to provide an image processing method capable of effecting a binary coding of the image information for obtaining superior reproduced image.

To this end, according to the invention, there is provided an image processing method having the steps of dividing an image into blocks, sorting the picture elements of each block into a first group of picture elements of higher densities and a second group of picture elements of lower densities, conducting discrimination of image and determination of the threshold value in accordance with the effective density representative values obtained for the first and second groups, and converting the image information into binary signals according to the thus determined threshold value.

DESCRIPTION OF THE PREFERRED EMBODIMENTS

Figure 1:
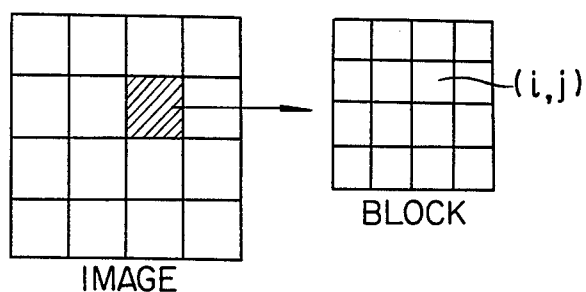
FIG. 1 is an illustrative diagram showing the dividing of an image into a plurality of blocks.

According to the invention, the image is sectioned into the group of blocks each of which having 4×4 picture elements (see FIG. 1). Then, mean density $$Xt\left(=\sum_i \sum_j Xij/N\right)$$

is determined from the densities $Xij$ of the picture elements (i, j) and the number N of the picture elements. Then, the picture elements in each block is classified into a first group of picture elements (number: $N_1$) of densities not lower than the mean density $Xt$ and a second group of picture elements (number: $N_2$, $N_1+N_2=N$) of densities lower than the mean density $Xt$. Then, density representative values of respective groups, e.g. the mean values of densities of picture elements in respective groups, are determined as follows.

$$a_1 = \sum_{Xij \geq Xt} Xij/N_1 \qquad (1)$$

$$a_2 = \sum_{Xij < Xt} Xij/N_2 \qquad (2)$$

Then, the discrimination of image and the determination of the threshold value is conducted by using the thus obtained density representative values $a_1$ and $a_2$.

Figure 2:
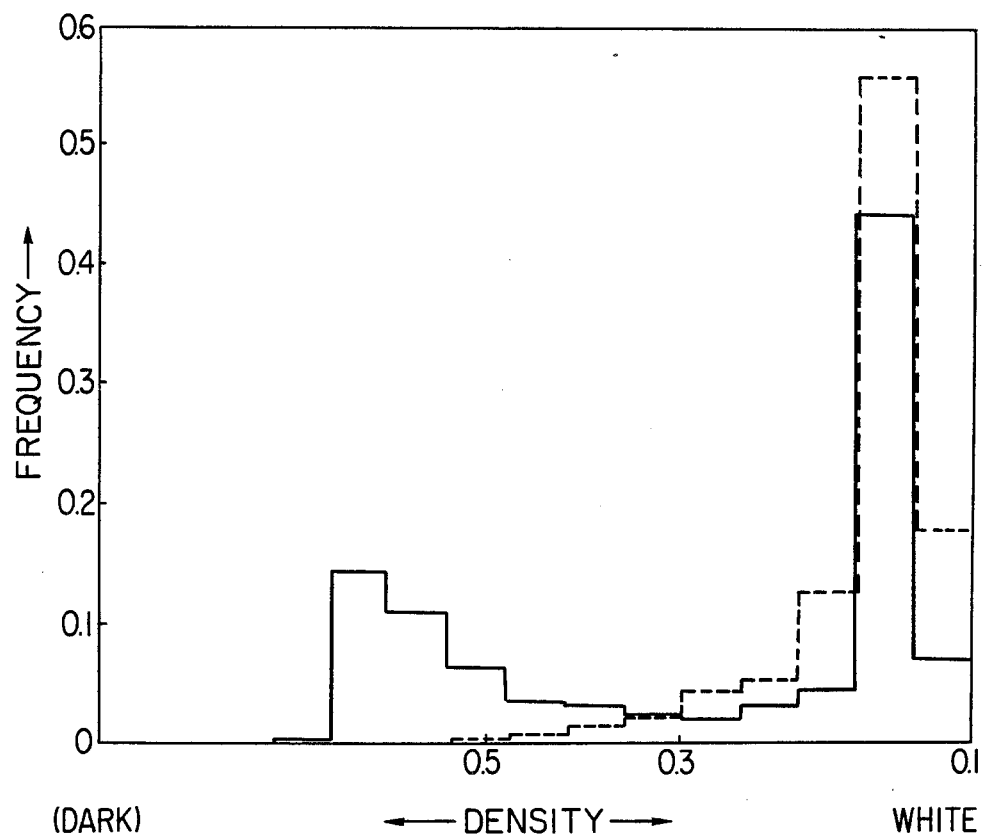
FIG. 2 and FIG. 3 are the density histogram prepared with the density signals obtained by scanning the line pattern.
Figure 3:
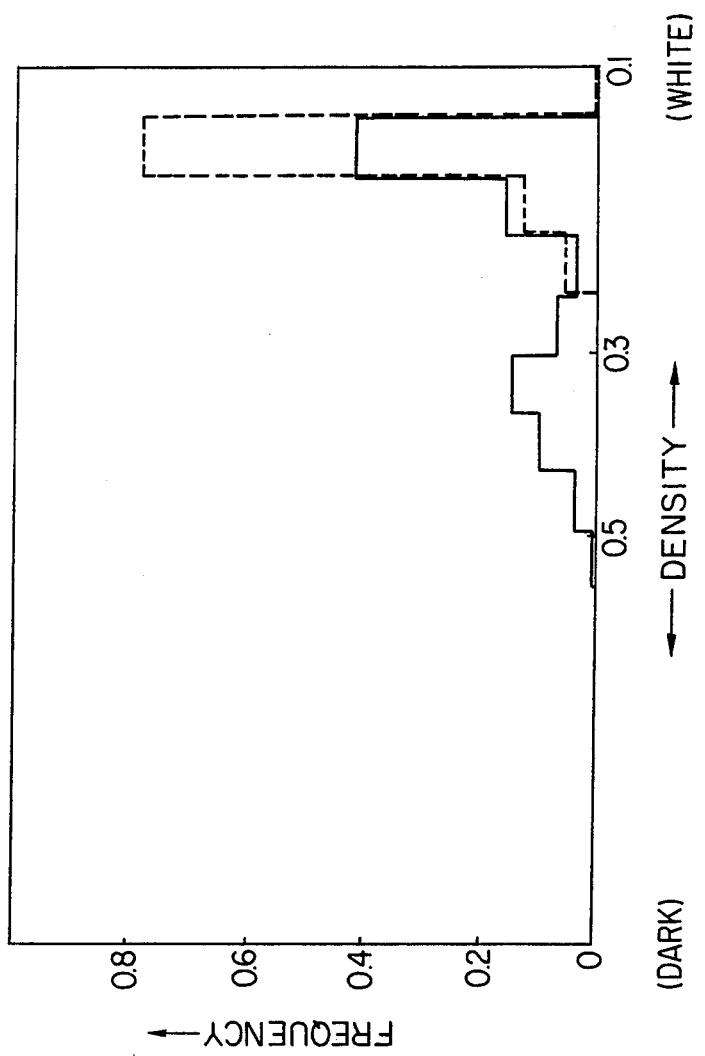

An explanation will be made hereinunder as to the difference of density histogram according to the kind of the image. FIG. 2 shows a histogram of the density representative values $a_1$ and $a_2$ of image information obtained when a line pattern (character image in books or the like) through a scanning at a density of 8 picture elements/mm. More specifically, in FIG. 2, the full line is the histogram of $a_1$ represented by the formula (1), while broken line shows the histogram of $a_2$ represented by the formula (2). This histogram is obtained because, in the case of the line pattern, the lines are dark while the background is bright. It will be seen that, while the histogram of the value $a_1$ has two peaks, i.e. a peak in the high-density side and a peak in the low density side, the histogram of the value $a_2$ has only one peak in the low-density side with low frequency in the high-density side. However, in the both histograms, the peak value in the low-density side is obtained at an equal density. This density will be referred to as "peak density value", hereinunder. This applies also to the line pattern of smaller line width and lower density. FIG. 3 is a histogram as obtained with line pattern of smaller line width and lower density, in which the histograms of the values $a_1$ and $a_2$ are shown by a full line and broken line, respectively, as in the case of FIG. 2. The coincidence of the peak density values at the lower density side is confirmed also from this Figure.

Thus, the line pattern has features peculiar thereto that the histograms of the values $a_1$ and $a_2$ have a common peak value density at the low-density side and that the histogram of the value $a_1$ have a peak in the high-density side while the histogram of the value $a_2$ has low frequency in the high-density side.

Figure 4:
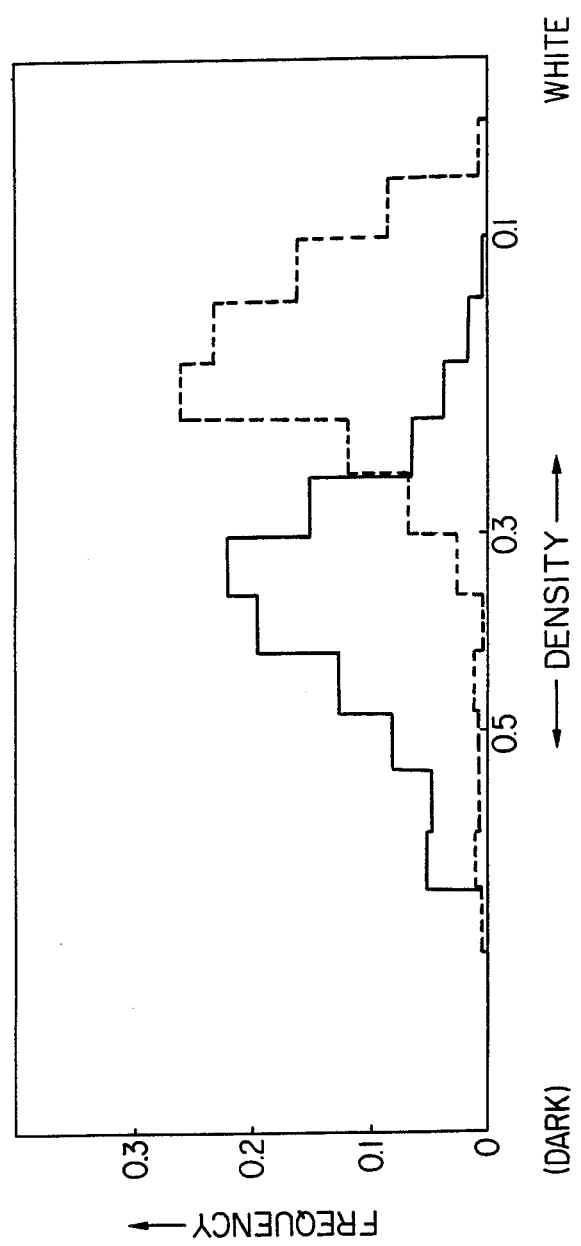
FIG. 4 and FIG. 5 are the density histogram prepared with the density signals obtained by scanning the gradation image.
Figure 5:
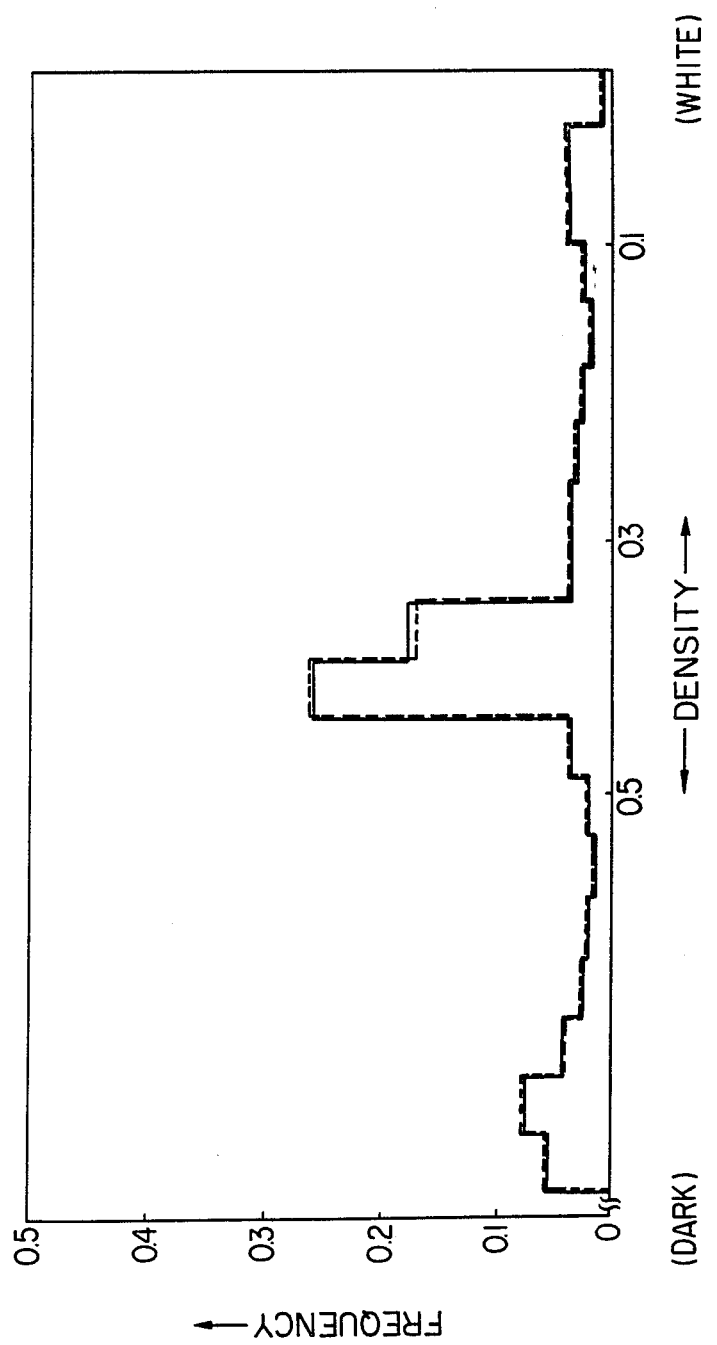

FIGS. 4 and 5 show histograms obtained with gradation images. More specifically, FIG. 4 shows the histogram for an image of a scenery or landscape having a high contrast, while FIG. 5 is a histogram for an image of a person (female with colored background) of a low contrast. In these Figures, the histograms of the values $a_1$ and $a_2$ are represented by full lines and broken lines, respectively. As will be seen from these Figures, in the case of a gradation image, the peak value densities do not coincide with each other or, if the peak value densities coincide with each other, a considerable frequency is observed in the high-density side. It is also understood that the higher contrast of image as shown in FIG. 4 provides a greater distance between peak values of the histograms for the values $a_1$ and $a_2$. These tendencies apply also to other gradation images.

Figure 6:
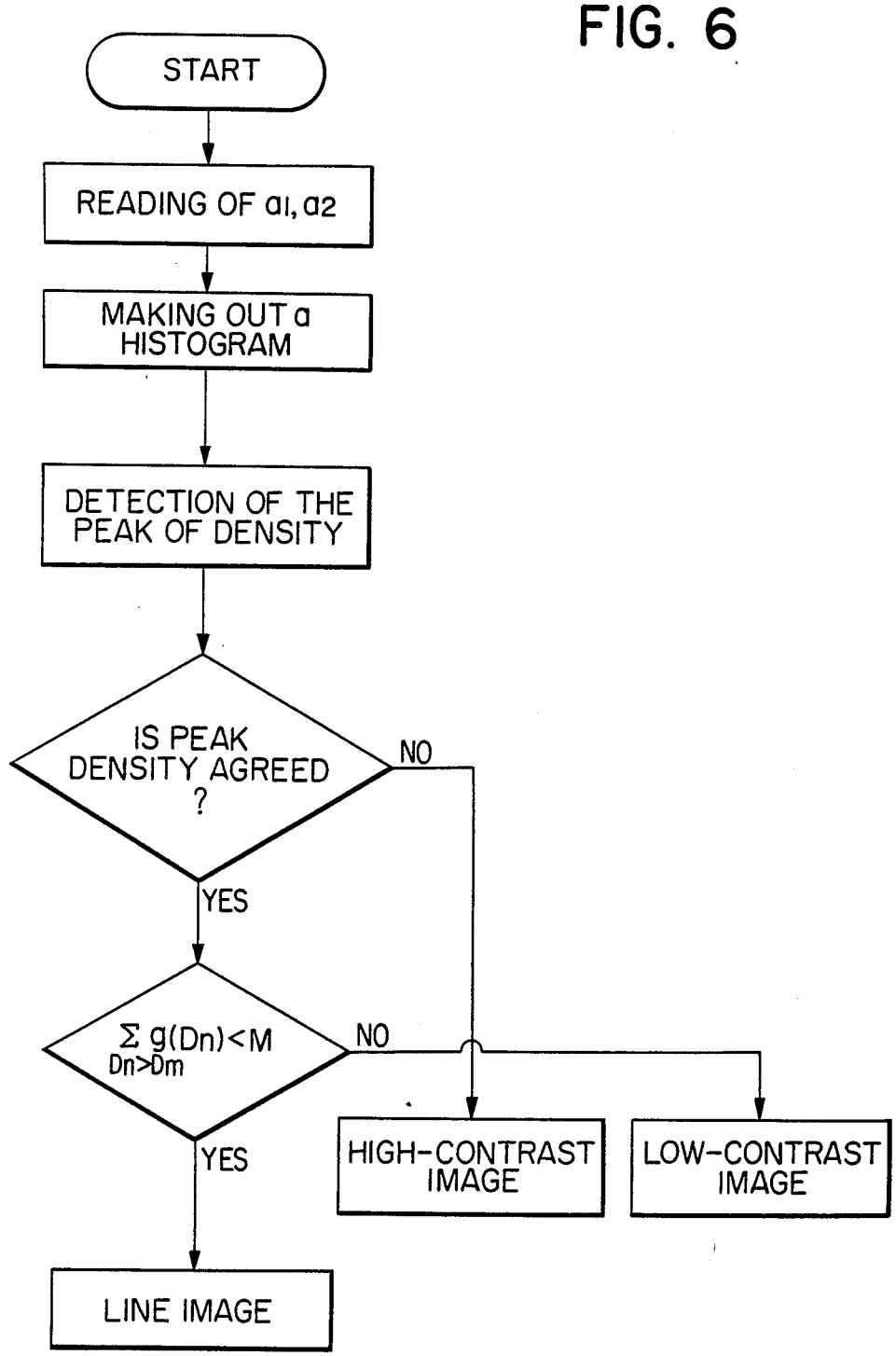
FIG. 6 is a flow chart showing an example of the processing procedure in accordance with the method of the invention.

It is, therefore, possible to make a discrimination of the kind of the image by conducting a processing by a procedure as shown by a flow chart in FIG. 6. Namely, the density representative values $a_1$ and $a_2$ of the groups of higher and lower densities are read for each of the blocks, and histograms are made out of these values. Then, crests and valleys of the histograms for the density representative values $a_1$ and $a_2$ are determined and the peak density values are detected. When the peak value densities of histograms of the density representative values $a_1$ and $a_2$ discord with each other, the image can be judged to be a gradation image of high contrast, because such a discordance is observed only when the image is a gradation image of high contrast.

On the other hand, when the peak value densities accord with each other, a judgement is made as to whether the accumulative value of the frequency in the density region higher than a predetermined density $Dn_0$ is greater than a judgement threshold value M in the histogram of the density representative value $a_2$, i.e. whether the following condition (3) is met.

$$\sum_{Dn > Dn_0} g(Dn) < m \quad (3)$$

As stated before, no distribution to the high-density side is observed in the line pattern. It is, therefore, judged that the image is a line pattern, when the condition of formula (3) is met. On the other hand, when the condition of formula (3) is not met, the image is judged to be a gradation image of a low contrast such as that shown in FIG. 5, because only the image as shown in FIG. 5 fails to meet this condition. As an alternative measure for the discrimination, it is possible to use the ratio of accumulative values of the values $a_1$ and $a_2$.

There is a certain correlation between $Dn_0$ and M, so that one is determined after the determination of the other. It is, however, preferred that the values $Dn_0$ and M are selected to range between 0.1 and 0.7 and between 0 and 0.9, respectively. In some kinds of images, a local density unevenness is observed in the background, as in the cases of diazo documents and newspapers. When histograms are made for such images, the unfavourable effect of the local density unevenness can be removed by reducing the level number of the densities of picture elements. For instance, while in the usual case the sampling is made at 8 bits to provide 256 levels, the level number is reduced to 64 by combining 4 levels into one or to 32 levels by combining 8 levels into one, i.e. to 5 bits.

After the discrimination of the image, the threshold value or the threshold value group is determined as follows.

(1) Line pattern

One density value in the valley in the histogram of the representative value $a_1$ in the higher-density side is selected and used as the threshold value.

(2) Gradation image of high contrast

A max, the maximum value of the density representative value $a_1$ and A min, the minimum value of $a_2$ are determined, and the threshold value group is formed by using the values A ranging between A min and A max. When the binary coding is conducted by making use of Dither method, it is preferred to select a smaller size of the Dither matrix or to select a Bayer type pattern.

(3) Gradation image of low contrast

The range of the threshold value is determined in the same manner as the image (2) mentioned above. When the binary coding is conducted by the Dither method, it is preferred to select a larger size of the Dither matrix or to use a vortex or network pattern as the pattern.

Figures 7, 8:
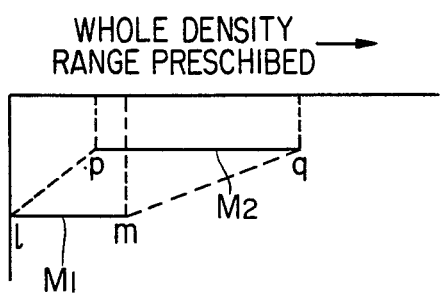
FIGS. 7 and 8 are illustrations concerning the expansion and shift of the threshold value group.

In the cases of the gradation images mentioned in (2) and (3) above, the ranges of the threshold value varies depending on the density range of the document. FIG. 7 shows, by way of example, the calculation of the threshold value range by means of Dither matrix. Namely, FIG. 7 shows an example of the procedure of the calculation of the Dither matrix used for the actual binary coding from a basic Dither matrix. More specifically, the matrix (a) is the basic matrix, while the matrix (b) is a dither matrix which is obtained by multiplying respective threshold values in the basic Dither matrix by ½. The matrix (c) is the matrix which is obtained by adding 5 to respective threshold values in the Dither matrix (b). In this manner, it is possible to freely expand, contract or shift the threshold value ranges while preserving the characteristics of the basic Dither matrix. Generally, provided that the range of the threshold value in the basic dither matrix $M_0$ is the line lm in the set density region as shown in FIG. 8 and that the range of the threshold value of the Dither matrix $M_1$ necessary for the binary coding of the image is given as the line pq (see FIG. 8), the factor K of multiplication for expanding the matrix from (a) to (b) and the amount S of shift for shifting the matrix from (b) to (c) can be obtained through calculations in accordance with the following formulae:

$$K=(q-p)/(m-l)$$

$$S=p-l$$

The image signals are binary coded by means of the thus selected new threshold value or the threshold value group.

Figure 9:
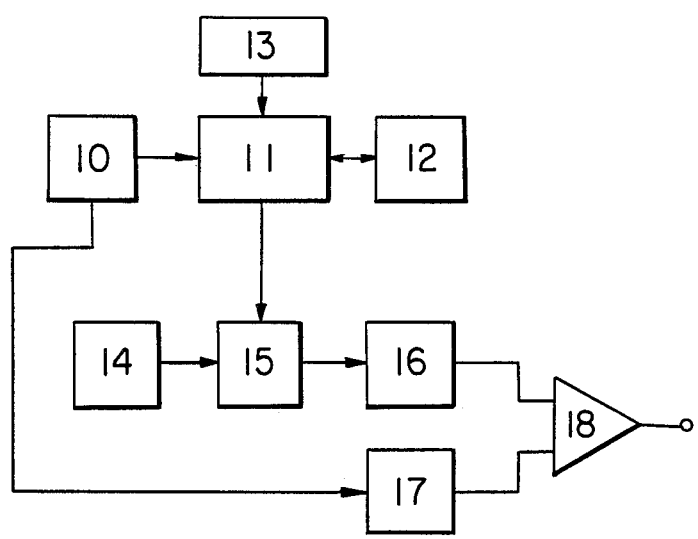
FIGS. 9 and 10 are illustrations of essential parts of the apparatus for carrying out the method of the invention.

An explanation will be made hereinunder as to an example of image processing apparatus for carrying out the method of the invention, with specific reference to FIG. 9. In this Figure, a reference numeral 10 denotes a storage device storing coded image information obtained through the block coding method, 11 designates a central processing unit (referred to as "CPU", hereinunder) for making arithmetic operations such as making of histograms and judgement such as discrimination of images, 12 designates a histogram-making memory (RAM) adapted to collect and store the data from the CPU 11 and to deliver the collected data to the CPU 11, and 13 designates a memory (ROM) for memorizing the programs of the arithmetic operations to be performed by the CPU 11 and programs of other operations. A reference numeral 14 denotes a memory (ROM) for storing the basic threshold value or the basic threshold value group, 15 denotes a computing unit which reads threshold value group of a predetermined distribution frequency from the memory 14 and to make a predetermined computation, and 16 designates a memory (RAM) for storing new threshold value group outputted from the computing unit 15. A reference numeral 17 designates a duplication circuit for duplicating the coded image information outputted from the memory device 10, while 18 denotes a comparator which compares the output (image signal) from the duplicating circuit 17 with the output (threshold value) from the memory 16 to produce binary signals.

The operation of the image processing apparatus having the described construction is as follows.

First of all, the CPU 11 reads the density representative values $a_1$ and $a_2$ from the memory device 10 and makes out histograms relating to the density representative values $a_1$ and $a_2$ within the memory 12. The reading is made for all of the blocks to complete two histograms. Then, the CPU 11 performs the detection of the peak density values with the aid of the memories 12 and 13, and discriminates the image through two judgements explained before in connection with FIG. 6. The CPU 11 then delivers the value or range to be taken as the threshold value or the threshold value group to the computing unit 15. The computing unit 15 then reads out the basic threshold value or the basic threshold value group from the memory (ROM) 14 in accordance with the output from the CPU 11, and makes a computation of new threshold value or new threshold value group from the thus read out threshold value or threshold value group. The new threshold value or threshold value group is written in the memory 16. The image signals are binary-coded by the comparator 18, in accordance with this new threshold value or threshold value group.

The above-described procedure for carrying out the invention is not exclusive. For instance, the histograms of the density representative values $a_1$ and $a_2$ may be made in series instead of being formed simultaneously, or the function of the CPU 11 may be widened to cover the function of the computing unit 15.

In the case where the image information to be processed is not code compressed by the block coding method, the CPU 11 reads image information from an image input device such as CCD sensor directly or indirectly through an image memory and conducts the discrimination of the image and the setting of the threshold value following the computation of the density representative values $a_1$ and $a_2$, thereby to perform the binary coding of the image information. The same procedure can be applied also to the case where an image memory storing the image information is prepared and the image information stored in the image memory are processed.

Figure 10:
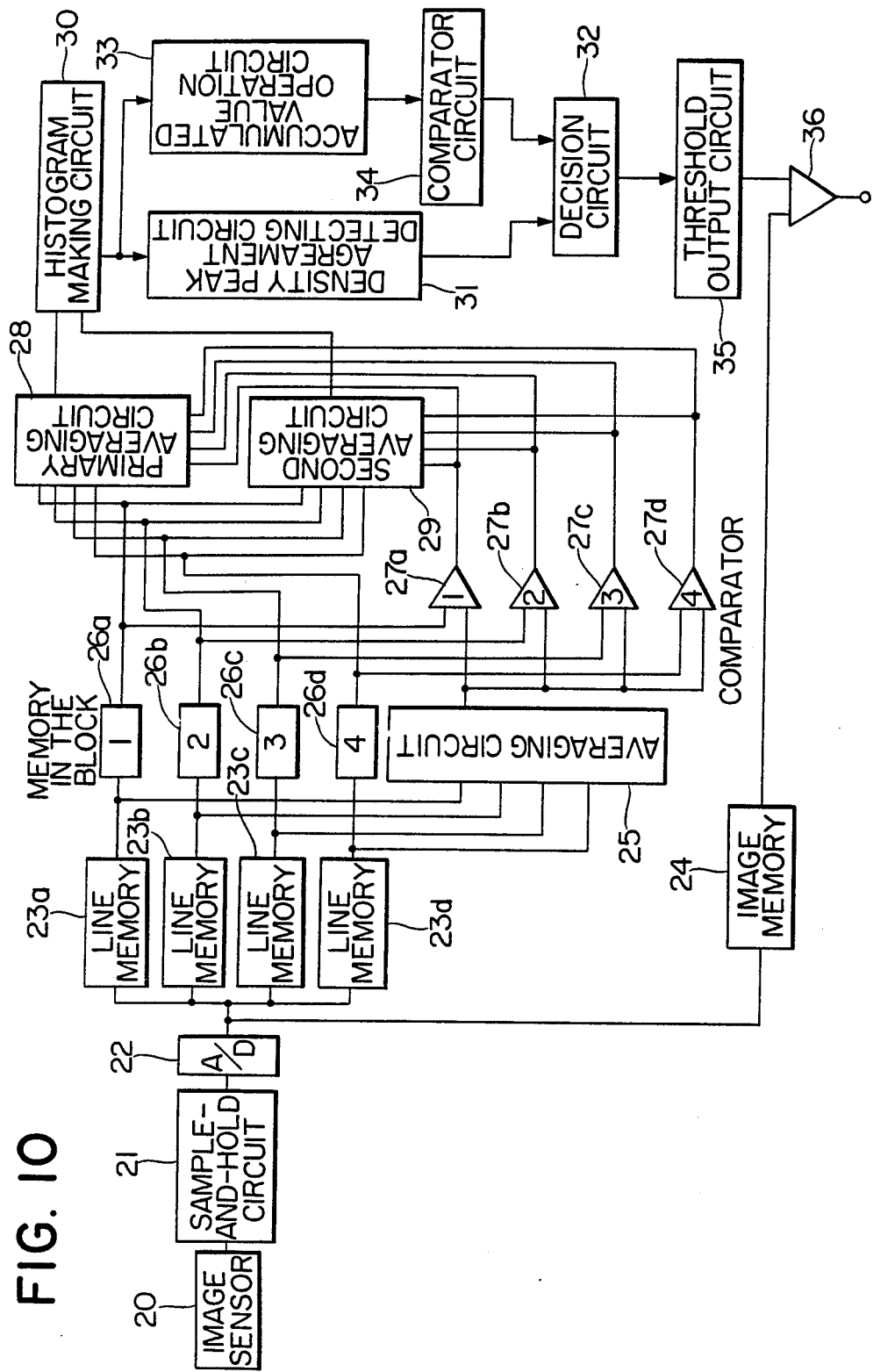

FIG. 10 shows another example of the image processing apparatus for carrying out the method of the invention. In this apparatus, the making of the histograms, discrimination of images and the setting of the threshold value are made in the same manner as that in the apparatus shown in FIG. 9. The apparatus shown in FIG. 10, however, is distinguished from the apparatus shown in FIG. 9 in that it does not employ the CPU, and in that it does not process the block coded image information but the processing is made while reading the image by means of an image sensor. The construction and operation of the apparatus shown in FIG. 10 will be explained hereinunder. It is assumed here that each block includes $4 \times 4$ picture elements.

The density signals of the image outputted from the image sensor 20 is sampled by means of a sample hold circuit 21 and is converted into digital signals by means of an A/D converter 22. The digital signals are then stored in four line memories $23a$ to $23d$ and an image memory 24. Needless to say, the number of the line memories can be increased in accordance with the speed of the subsequent processing. The outputs from the line memories $23a$ to $23d$ are delivered, in terms of the block, to a block averaging circuit 25 and block memories $26a$ to $26d$. The block averaging circuit 25 determines the mean density Xt the picture elements within a block. The mean density Xt, i.e. the output from the mean circuit 25, is compared by comparators $27a$ to $27d$ with the densities of the picture elements in the block, i.e. with the outputs from block memories $26a$ to $26d$ in the block. When the density of a picture element is not exceeded by the mean density Xt, the signal representing the density of this picture element is latched within a primary averaging circuit 28. To the contrary, when the picture element density is exceeded by the mean density Xt, the picture element density signal is latched in a secondary averaging circuit 29. The density representative values $a_1$ and $a_2$ for this block are determined by these two averaging circuits 28 and 29. From the view point of shortening of the data processing time, it is preferred to conduct the computation in a parallel manner by sending, after delivering the picture density signals to the averaging circuits 28 and 29, the picture element density signals of the next block from the line memories $23a$ to $23d$ to the memories $26a$ to $26d$ in the block and also to the block averaging circuit 25. The density representative values $a_1$ and $a_2$ thus determined by the averaging circuits 28 and 29 are delivered to the histogram making circuit 30 which makes out the histograms.

Then, a density peak agreement detecting circuit 31 examines whether the corresponding peak value densities in the histograms of the values $a_1$ and $a_2$ agree with each other and delivers the result to a decision circuit 32. On the other hand, an accumulative value operation circuit 33 calculates the accumulative value of frequency of values in the region of density higher than a predetermined density in the histogram of the density representative value $a_2$. The output from this circuit 33 is compared in the comparator circuit 34 with the threshold value and the result of this comparison is delivered to the decision circuit 32. Upon receiving a signal representing the discordance of peak density values from the agreement detecting circuit 31, the decision circuit 32 make a decision that the image is a gradation image of a high contrast, regardless of the nature of the output from the comparator circuit 34. On the other hand, when the peak density values of both histograms agree with each other, the decision circuit 32 decides whether the accumulative value is greater or smaller than the threshold value, making use of the output from the comparator circuit 34. Namely, when the threshold value is exceeded by the accumulative value, the decision circuit decides that the image is a gradation image of a low contrast, whereas, when the accumulative value is smaller than the threshold value, the decision circuit decides that the image is of a line pattern. In accordance with the result of the decision, the decision circuit 32 delivers the value or range to be taken as the threshold value of threshold value group to a threshold output circuit 35. Then, a comparator 36 conducts the binary coding of the image information stored in the image memory 24, by making use of the output from the threshold output circuit 35. In this apparatus, it is possible to arrange such that the calculation of the accumulative value is conducted only when the agreement of the peak densities is confirmed.

As has been described, according to the invention, the threshold value or the threshold value group necessary for the binary coding of the image information can be set automatically in accordance with the kind of the image. It is, therefore, possible to effect the binary coding of the information signal so as to ensure good quality of the reproduced image regardless of the kind of the image.

What is claimed is:

1. An image processing method comprising steps of:
   dividing an image into a plurality of blocks, each block comprises a plurality of picture elements;
   sorting the picture elements in each block into a first group consisting of picture elements of densities not lower than a reference density and a second group consisting of picture elements of densities lower than said reference density;
   obtaining a representative density of picture elements of said first group in each block;
   obtaining a representative density of picture elements of said second group in each block;
   effecting an image discrimination in accordance with said representative densities;
   effecting a determination of threshold value in accordance with said representative densities and result of said image discrimination;
   said image discrimination and determination of threshold values are conducted by using histograms made out from said representative density of picture elements of said first group in each block and said representative density of picture elements of said second group in each block; and
   converting image information into binary signals according to said threshold value.

2. An image processing method according to claim 1, wherein said reference density is a mean density of picture elements in each block.

3. An image processing method according to claim 2, wherein an effective density value at a valley portion of said histogram for the effective density representative value of the higher density side out of said effective density representative values is adopted as a threshold value for the line pattern, and the binary coding is made by making use of this threshold value.

4. An image processing method comprising steps of:
   dividing an image into a plurality of blocks, each block comprises a plurality of picture elements;
   sorting said picture elements in each block into a first group consisting of picture elements of densities not lower than a reference density and a second group consisting of picture elements of densities lower than said reference density;
   obtaining a representative density of picture elements of said first group in each block;
   obtaining a representative density of picture elements of said second group in each block;
   effecting an image discrimination in accordance with said representative densities;
   determining maximum and minimum values of said representative densities;
   forming a threshold value group with a plurality of effective density values ranging between said maximum and minimum values; and
   conducting binary coding for gradation image according to said threshold value group.

5. An image processing method comprising steps of:
   dividing an image into a plurality of blocks, each block comprises a plurality of picture elements;
   sorting said picture elements in each block into a first group consisting of picture elements of densities not lower than a reference density and a second group consisting of picture elements of densities lower than said reference density;
   obtaining a representative density of picture elements of said first group in each block;
   obtaining a representative density of picture elements of said second group in each block;
   effecting an image discrimination in accordance with said representative densities;
   determining maximum and the minimum values of said representative densities;
   forming a Dither matrix having elements constituted by a plurality of effective density values ranging between said maximum and the minimum values; and
   converting image information into binary signals adopting the smaller size of said Dither matrix or a specific pattern for the high-contrast gradation image while adopting the greater size of said Dither matrix or a specific pattern for low-contrast gradation image.

* * * * *